CODE CONVERTER

Filed Aug. 26, 1952 3 Sheets-Sheet 1

INVENTORS
Spencer W. Spaulding
& Ralph Pressman
BY Morris L. Rabkin
ATTORNEY

CODE CONVERTER

Filed Aug. 26, 1952 3 Sheets-Sheet 2

INVENTORS
Spencer W. Spaulding
& Ralph Pressman

BY Morris A. Rabin

ATTORNEY

May 12, 1959 S. W. SPAULDING ET AL 2,886,241

CODE CONVERTER

Filed Aug. 26, 1952 3 Sheets-Sheet 3

INVENTORS
Spencer W. Spaulding
& Ralph Pressman

BY Morris L. Rakin
ATTORNEY 2,886,241

CODE CONVERTER

Spencer W. Spaulding, Wynnewood, and Ralph Pressman, Philadelphia, Pa., assignors to Radio Corporation of America, a corporation of Delaware Application August 26, 1952, Serial No. 306,458

The terminal fifteen years of the term of the patent to be granted has been disclaimed 11 Claims. (Cl. 235—154)

Figure 1:
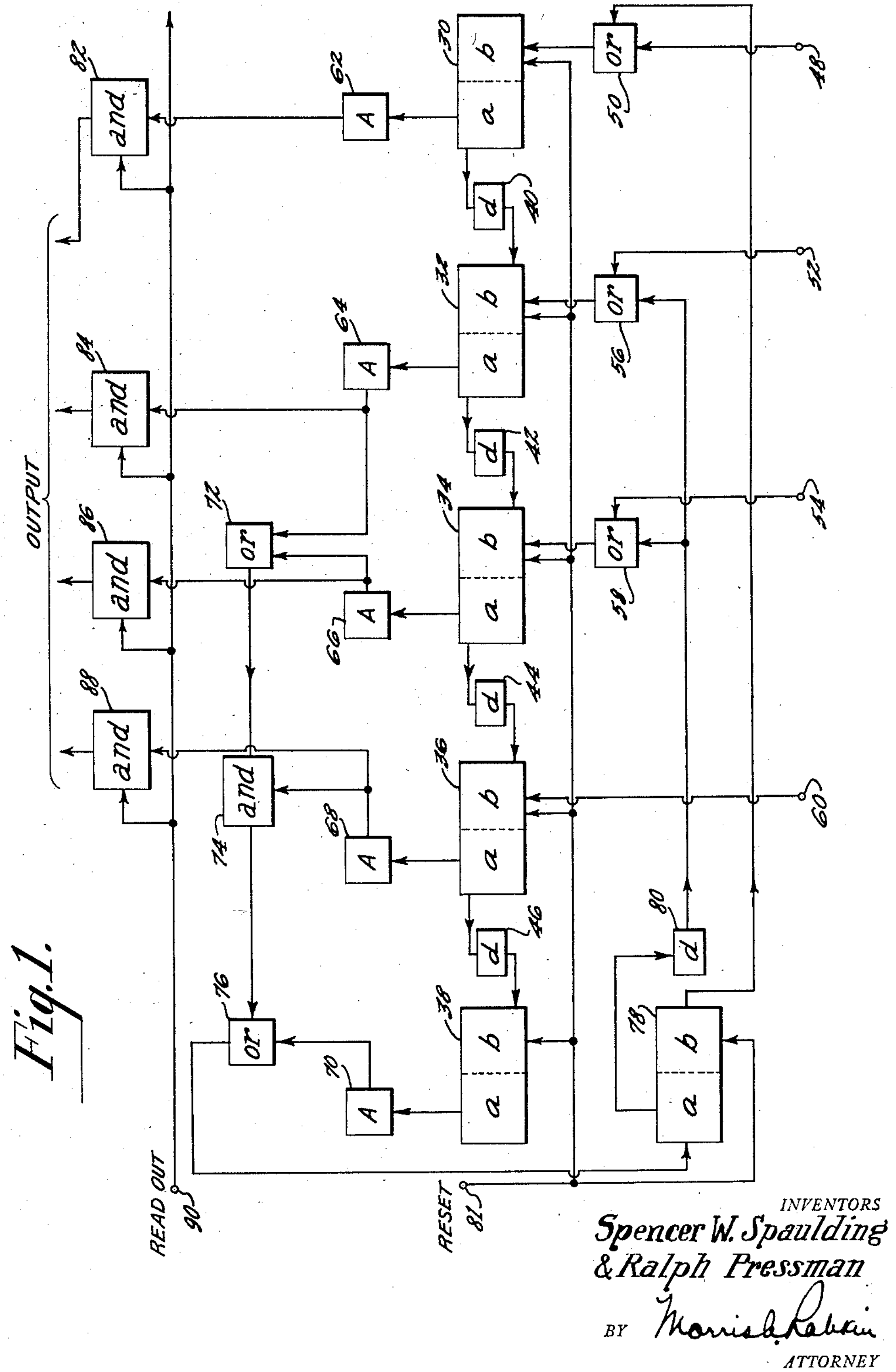

This invention relates to electronic apparatus for converting electrical signals in one code to signals in a second code.

In high speed electronic computing systems, it has been found advantageous to use a binary coded decimal representation of numbers rather than a pure binary representation. The binary coded decimal representation is based upon the well known binary system which encodes numbers to the base ten by breaking the numbers down to their component powers of two. In the binary coded decimal representation, the first four digit positions are the same as in the binary system, representing $2^0$ to $2^3$. The difference is in the fifth digit position. In the pure binary system, the fifth digit represents $2^4$, while in the binary coded decimal representation it represents ten. Thus, for numbers below ten, the two systems are the same, but for numbers above ten, the systems have different representations of the same number. In this manner, a number to the base ten having several decimal digits, for example units, tens, and hundreds, is encoded in the binary coded decimal system by representing each decimal digit separately in the binary system. In data handling apparatus, wherein relatively simple operations are involved, use of the binary coded decimal system requires less converting operations. This allows the use of less apparatus in the computing system and makes for cheaper equipment. Further, the binary coded decimal system allows the use of fewer computing operations which enables simpler apparatus to be used.

In systems using the binary coded decimal representation, each decimal digit, which is in binary form, of the numbers to be operated upon, is individually added. Since only two numbers are added at one time and each individual digit of these numbers lies in the range of zero to nine, the total sum number can never be more than 18, and, in the case of a carry from a previous lower order decimal digit, the sum number can never be more than 19. Addition or other mathematical operations leave the number in a binary form and the number must be converted back to the binary decimal representation having a decimal digit from zero to nine in binary form and a tens digit which is a carry to the next higher order decimal digit. Consequently, the need arises for a conversion apparatus for converting numbers from zero to 19 in a pure binary representation to these same numbers in a binary coded decimal representation.

Several methods are known for obtaining this conversion, and have generally been utilized to convert an inherently binary electronic counter to a decade counter. One of these methods comprises separately feeding back pulses from a plurality of higher binary order trigger circuits to a plurality of lower binary order trigger circuits. Such systems utilize feedback to introduce artificial counts in the trigger circuits at different times during the counting sequence and change the stable condition of several different trigger circuits. The fact that a plurality of different trigger circuits initiate the artificial counts in the counter circuit tends to slow down the speed of the counter and complicate the circuit adjustment and design. Further, the technique of adding artificial counts between the counting sequence of pulses requires quite accurate and critical timing.

An improvement over this technique was made by introducing artificial counts by feedback at a single point during the counting sequence. This also changes the condition of certain trigger circuits, but is still subject to the objection of requiring accurate differential timing and an excessive amount of control apparatus which must be critically adjusted. The counting rate, however, is higher.

Another known method used for converting a binary counter to a binary decimal counter involves the use of pulse interaction between normal operating pulses and artificially produced pulses to both switch and to block or prevent normal binary operation of the counter circuit. The successful operation of this arrangement is dependent upon the relative value of the pulses opposing each other and of necessity involves an extremely critical component value and continued adjustments. These factors complicate the problems of construction and maintenance of this type system.

Since several of the methods referred to above require a plurality of additional vacuum tubes to accomplish the differential adding, switching, and blocking functions, these additional tubes of necessity require more circuitry and thus a larger power supply.

Consequently, an object of this invention is to provide an improved apparatus for converting a binary representation to a binary decimal representation that can operate at a high rate of speed.

Another object of this invention is to provide an arrangement requiring a minimum of apparatus and circuitry for converting a binary representation of a number to a binary coded decimal representation of the same number.

A further object of this invention is to provide a relatively inexpensive and efficient binary to binary coded decimal converter whose construction, operation, and maintenance is relatively simple.

A purpose of this invention is to provide a novel gate arrangement for converting a binary counter to a binary decimal counter that operates independently of the binary counting or adding function.

Another purpose of this invention is to provide a binary to binary decimal converter that operates only if the binary number is ten or greater.

These and further objects of the present invention are achieved by providing apparatus consisting of five serially connected parallel bistable trigger channels that are adapted to operate as a parallel adder and receive a sum number from zero to eighteen in pure binary form. An arrangement of sensing and coincidence gates are connected to certain of these channels to sense whether the sum number is greater than or equal to ten. If the number is greater than or equal to ten, these gates set a bistable trigger circuit whose delayed leading edge adds a binary six to the registered sum number making it greater than or equal to sixteen, or expressed in another manner, changing it to binary coded decimal form. The number, now in binary coded decimal form, is read out of the adder, and fed to a storage unit. A clearing pulse restores all of the trigger channels to zero and its trailing edge resets the bistable multivibrator. The resetting of the multivibrator adds a carry pulse to the first channel of the adder to add to the next higher order decimal digit which the adder is now ready to receive. If the sum number is less than ten, the gates do not operate and the number remains in binary form which, for numbers less than ten, is represented in the same manner as a binary decimal number.

Figure 2A:
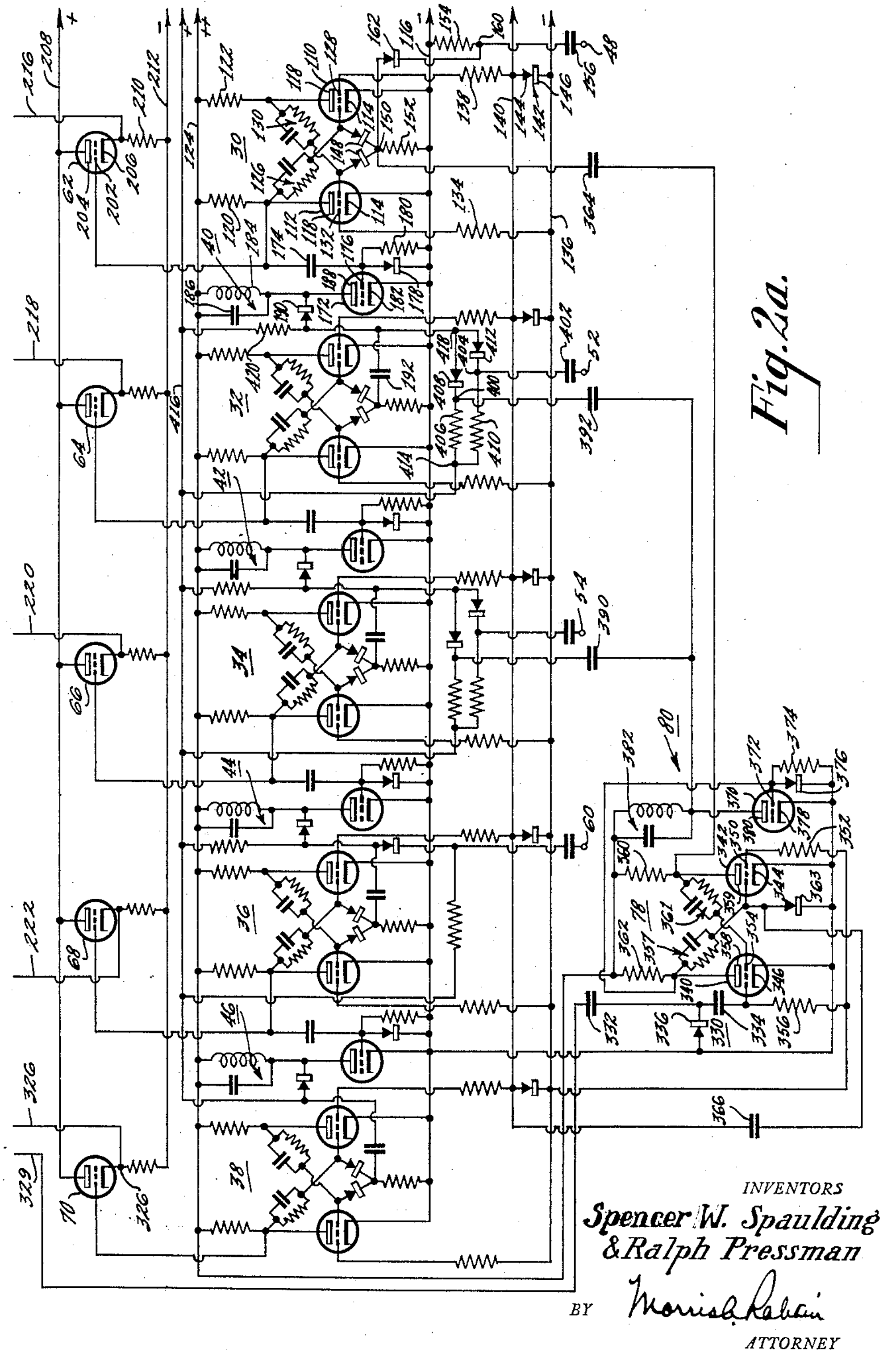
Figure 2B:
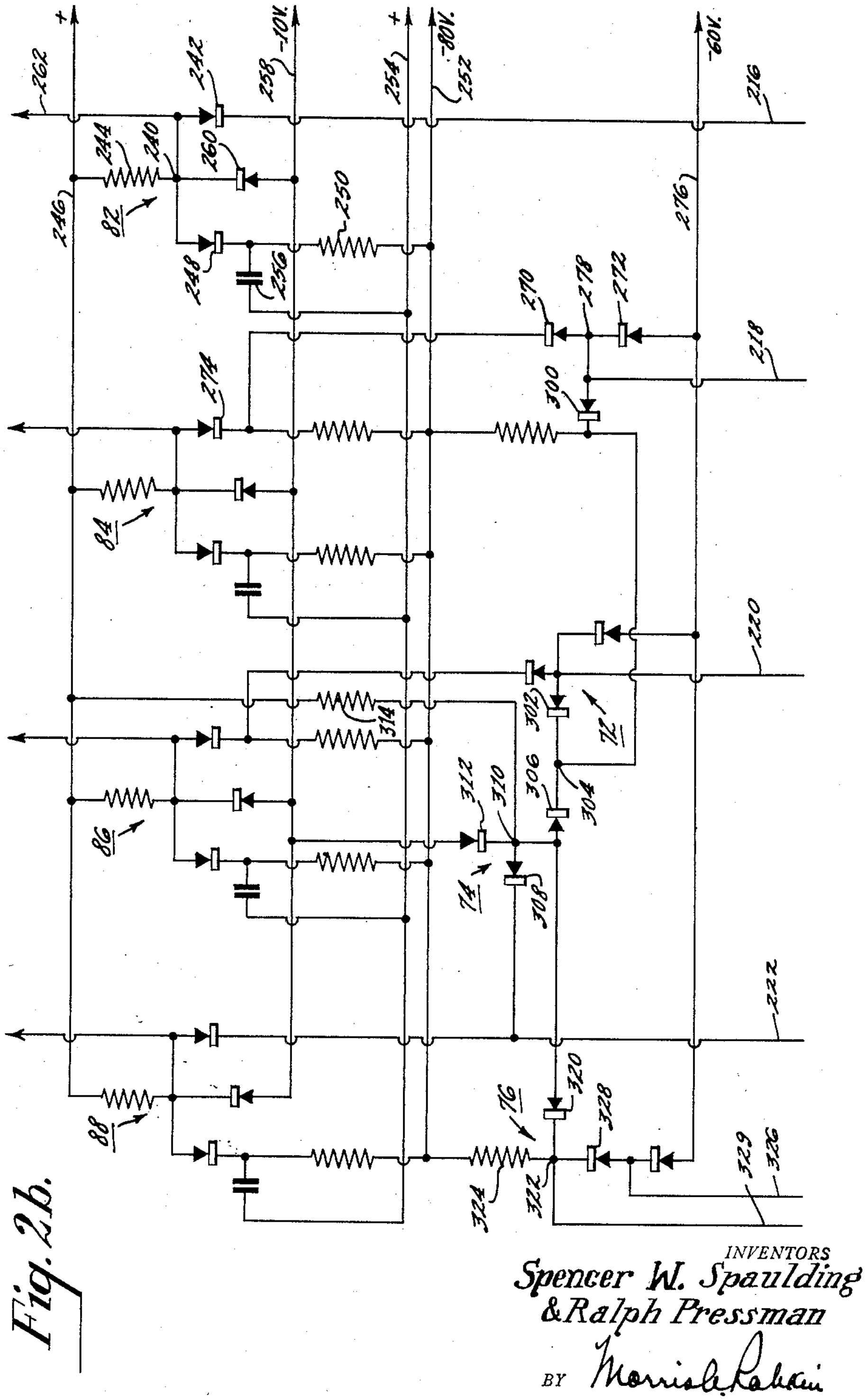

Further objects of this invention as well as a better understanding thereof will become apparent from the following description considered in conjunction with the accompanying drawings in which:

Fig. 1 is a block diagram of an arrangement of the conversion apparatus in accordance with this invention; and Figs. 2*a* and 2*b* are circuit diagrams of the arrangement of a conversion apparatus shown in Fig. 1 and are to be considered jointly.

Fig. 1 shows a block diagram of the circuitry used to accomplish the binary to binary coded decimal conversion. Five trigger circuit channels 30, 32, 34, 36, and 38 are arranged in cascade. The individual trigger circuits may be of any type that may be connected to operate in a binary manner. A description of one suitable type of trigger circuit that may be used is found in (column 2, line 22), of U.S. Patent 2,584,811. Another type will be described below in conjunction with Fig. 2. In the normal binary counting operation, input pulses to be counted are impressed upon the first channel of the counter. On each second impulse received, the first channel passes an impulse to the second channel. The latter passes an impulse to the third channel on each alternate impulse received from the first channel and so on through the series. Thus, each successive channel represents a higher power or order of two than the preceding one. Each trigger circuit has two tubes which are represented by the *a* and *b* sections of each of the five channels 30, 32, 34, 36, and 38 in the Fig. 1.

In the starting condition of each trigger circuit, the left hand side, *a*, is conducting. This will hereafter be referred to as the zero condition. When the reverse is true and side "*b*" is conducting, the channel is said to be in the "one" condition. It is on the receipt of a second pulse that a channel changes from a one to a zero condition and sends a pulse to the next higher order (higher power of two) channel. Delay circuits 40, 42, 44, and 46 are, for reasons to be later described, coupled between each lower order channel and the next higher order channel.

All the trigger channels except for the fifth 38, have associated individual input terminals 48, 52, 54 and 60. The input terminal 48 for the first channel is connected directly through an "or" gate 50 to the input of the first channel.

Likewise, input terminals 52 and 54 are, respectively, connected through "or" gates 56 and 58 to the second and third channels 32 and 34, respectively (hereinafter referred to as the "two" and the "four" channels). Input terminal 60 is connected directly to the input of the fourth or the "eight" channel 36.

An "or" gate is a logical gating arrangement having two or more inputs and a single output. Input pulses are applied to one or more of these "or" gate inputs. The "or" gate operates to pass a pulse if input pulses are present on any one of the inputs. It is generally used to isolate several inputs to a common point from each other. An "or" gate is sometimes called a sensing gate since it functions to sense the presence of a signal on any one of its inputs.

The output of each channel is connected from the "*a*" side of each channel to the input of a different one of five amplifiers 62, 64, 66, 68 and 70. The output of the amplifiers of the "two" and "four" channels 32 and 34 are connected to an "or" gate 72 to pass an impulse when either of these channels is energized. The output of "or" gate 72 is connected to one of the inputs of an "and" gate 74, and the output of the amplifier 68 for the "eight" channel is connected to the second input of the "and" gate 74. The "and" gate, similar to the "or" gate, is a logical gating system having a plurality of input terminals and a single output terminal. The function of this "and" gate, sometimes called a coincidence gate, is to pass an impulse only when all of the inputs are energized simultaneously. The term coincidence gate follows logically since the "and" gate functions to pass a signal only on the coincidence of all input signals. In this case, the "and" gate 74 will pass an impulse only when the "eight," and the "two" or "four" channels are in a "one" condition.

The output of the "and" gate 74 and the output of the amplifier 70 for the "sixteen" channel 38 are connected to the two inputs of an "or" gate 76. The output of the "or" gate 76 is in turn connected to the input of a bistable trigger circuit 78. The bistable trigger circuit 78 has two sides, *a* and *b*, with the "*b*" side normally conducting. On receipt of a keying pulse from "or" gate 76, the "*a*" side is adapted to generate a single voltage pulse, the "*a*" side is connected through a delay circuit 80 to the second inputs of the two "or" gates 56 and 58 of both of "two" and "four" channels of the counting circuit. A source of reset voltage 81 adapted to generate a negative pulse is connected to the "*b*" side input of the bistable multivibrator. On receipt of the positive going trailing edge of this pulse the "*b*" side generates an output voltage pulse. The "*b*" side is connected to the second input of the "or" gate 50 of the "one" channel.

Four output "and" gates 82, 84, 86, and 88 are provided, each having two inputs. Each of the outputs of the amplifiers 62, 64, 66, and 68 for each of the first four channels 30, 32, 34, and 36 is connected to one of the inputs for each of these "and" gates. The other input of the "and" gates is connected to a source of readout voltage 90. The reset voltage source 81 is also connected to the "*b*" side of all of the trigger channels to reset all channels to a zero condition.

Each binary number representative of a decimal digit of numbers to be added and converted is fed directly to each of the first three parallel channels through "or" gates from the input, and directly from the input to the "eight" channel. By way of illustration, assume that the two numbers to be added are 36 and 35. First, the binary representation of the units decimal digit six of the first number 36 is fed to each of the first four parallel channels. Since the binary representation of six is $[0(2^3)+1(2^2)+1(2^1)+0(2^0)]$, the "two" and "four" channels will assume a one condition. The remaining channels will maintain this original zero condition.

Next, the binary representation of the units decimal digit five of the second number 35 is fed to each of the parallel channels. The channels will then immediately change there condition in a binary manner to represent the binary sum number eleven. The delay circuits between each channel prevent the change pulses resulting from the parallel addition from interfering with the parallel inputs, by delaying any change pulse until the next higher order channel has received its input pulse and assumed a quiescent condition.

The binary sum representation of this number eleven will cause the "eight," "two," and "one," channels to assume a one condition with a voltage present at their outputs. This voltage on these channels is amplified and applied to one input of the "and" gate 74, and to the other input of the "and" gate 74 through the "or" gate 72. The "and" gate 74 functions to pass an impulse only if voltage impulses from the "or" gate 72 and the "enght" channel are applied together. Thus, the "and" gate 74 will pass an impulse only if the "eight" channel and either of the "two" or "four" channels are in an "on" ("one") condition. Expressed in another manner, the "and" gate 74 will pass an impulse only if the binary sum number represented is more than ten.

The impulse from the "and" gate 74 is then fed through "or" gate 76 to the bistable trigger circuit 78, thus keying it to generate a single pulse. This pulse is fed through delay circuit 80 and "or" gates 56 and 58 to the inputs of the "two" and the "four" channels of the counter. This effectively adds a binary six to the number eleven. The counter then goes through the normal series of changes resulting in the sum (17) being registered, which is the binary coded decimal representation of the number eleven. Here again, the delay circuits between each channel prevent any counting errors which may result from applying pulses to the "two" and "four" channels simultaneously. Further, the delay circuit 80 delays the "add six" pulse until the trigger channels have completed any changes in condition they are going through.

With the number eleven now converted to binary coded decimal form, the representation on the first four channels is transferred to a storage unit (not shown) through output "and" gates 82, 84, 86, and 88. This is accomplished by applying a pulse from the readout voltage source 90 to the second input of each of the output "and" gates. This readout pulse supplies the second input to the "and" gates 82 to 88 which allows them to pass an output pulse if the signal from the channels is present. The "and" gate as was described above will pass a pulse to its output only if voltages are present simultaneously at all of its inputs. Consequently, if no output pulse is present on any channel, no pulse will pass because of the readout keying pulse alone.

During the converting operation, any transient and change impulses, occuring after the trigger circuit 78 has once been set, have no further effect on the trigger circuit as it is effectively desensitized for the duration of its period.

After the converted number is read out of the channels, a reset keying pulse is applied at the reset input 81 which connects the pulse to the "*b*" side of each channel and to the "*b*" side of bistable trigger circuit 78. This causes each trigger channel to switch to a zero condition. The reset pulse is differentiated so that the trailing edge causes the trigger circuit 78 to change back to its original condition thereby generating a pulse which is applied to the "one" channel of the counter since the number converted was more than ten. The duration of the reset pulse must be longer than the delay time of the delay circuits between channels since, when the reset occurs, any channel which is a one condition will generate an output pulse to the next succeeding channel. Consequently, with a long reset pulse these output pulses will be cancelled as they arrive at the succeeding channels. Since the bistable trigger circuit 78 is returned to its normal condition with the trailing edge of the reset pulse, these change transients have no effect thereon as was described above. The converter is now ready to receive the next binary number for conversion with the "one" carry automatically added in.

The next binary represented numbers to be inserted are the tens digits of the numbers being added. Thus, for the numbers assumed, the binary three is fed to the converter. The parallel channels will immediately add the one carry from the lower order decimal digit sum to the tens digit three. Next, the corresponding decimal digit (the tens digit) three of the number 35 is fed to the channels in binary form. The three is also automatically added in a binary manner to give a binary representation of the sum number seven.

Where the registered decimal digit sum number is below ten, in this case seven, the "four," "two," and "one" channels will be in a one condition. These channels will place voltage impulses through the "or" gate 72 to the "and" gate 74. However, since no voltage exists on the "eight" channel, the second input to the "and" gate 74 is lacking and no impulse will pass. This is the correct operation for numbers less than ten since for these numbers the binary and binary coded decimal representations are the same and no conversion is necessary. In this case, when the reset pulse occurs, any of the channels, which are in a one condition, will be changed to a zero condition and an output pulse will be sent to the next higher channel. This output pulse can have no affect on the higher channel since the higher channel's input is held negative by the reset pulse. Nor will the trigger circuit 78 be affected since all channels immediately assume a zero condition when reset occurs and the trailing edge of the reset pulse finds a positive grid and has no affect on the multivibrator.

It is contemplated that the numbers fed into the converter to be added and converted will have a certain maximum length of "*n*" decimal digits. To ensure that resulting sum number will be complete and the converter cleared, the readout and reset pulses, for each decimal digit's sum and carry, are applied $n+2$ times for each set of numbers to be added. In this manner, if the *n*th decimal digit sum is more than ten, its one carry, after the converter is reset, is placed in the $n+1$ decimal digit position. The carry is then read out in the standard manner. Since no further input decimal digits are at the $n+1$ position, there can be no further carry, and the converter is cleared completely by the reset pulse for the $n+2$ position, ready for the next set of numbers to be added and converted. Since the converter will operate in this manner at all times, if the numbers to be added are less than *n* digits, the remaining digits are filled with zeros to complete the *n* digit positions. This eliminates the need for sensing the size of the numbers to be converted before entering them into the converter.

If the registered sum number is sixteen or above, the direct connection from the "sixteen" channel, through "or" gate 76 to the trigger circuit 78, transmits a keying impulse to the trigger circuit to perform the necessary conversion. The upper limit for the sums which this circuit may receive is nineteen. This limit exists because provision is made for only one carry pulse to be generated. However, since a carry pulse from a previous decade may be present, and since the total sum can not exceed nineteen, the highest sum number that may be applied is eighteen. This causes no actual limitations to be placed on the apparatus since addition in the binary decimal representation consists of successively adding each decimal digit of one number to the corresponding decimal digits of a second number. As is well known in the decimal system any one digit can not be more than nine. Consequently, the highest sum possible is eighteen or in case a carry is present, nineteen, which is the capacity of the apparatus.

Since the conversion does not take place until after a sum number is obtained, no limitations are placed on the speed of entry of the numbers to be added. Further, since the converting pulses are not applied between pulses as the count is in progress, numbers below ten are accurately registered and remain in binary decimal form as well as numbers above ten. This is not true in the known systems using adding or blocking pulses applied while the counter is in progress, as by these methods binary representation is incorrect until ten is reached.

Further advantages of this invention are thus seen to be that relatively simple gate and conversion circuits are required and the operation of the circuits do not depend upon critical timing or upon voltage values. All of this makes for simple, efficient, and inexpensive conversion apparatus.

Referring now to Figs. 2*a* and 2*b* circuitry is shown for carrying out the functions of the block diagram of Fig. 1.

Five bistable trigger circuits 30, 32, 34, 36, and 38 comprise the five parallel channel (trigger circuits) described above with reference to Fig. 1. Each of these trigger circuits comprises two electronic tube elements which may conveniently be the two halves of a twin type tube. For explanation purposes, only the trigger circuit of the first channel will be described as the remaining channels are all similar. The trigger circuit shown therein contains two triodes 110 and 112 each of which contains a plate, cathode and grid. While triodes are here shown and described, pentodes or other multigrid element tubes may also be used. The cathodes 114 of both tubes are connected to a negative potential line 116. Similarly, both plates 118 are each connected through equal value resistors 120 and 122 to a plate voltage supply line 124. The plate of tube 112 is joined through a resistance and capacitance 126 connected in parallel to the grid 128 of the right hand tube 110. Likewise, the plate of tube 110 is joined through a resistance and capacitance 130 connected in parallel to the grid 132 of the left hand tube 112. The grid 132 of the left hand tube 112 is also connected through a resistance 134 to a negative potential bias line 136. This connection places the grid 132 at a point of a voltage divider consisting of resistances 134, 130, and 122. The grid 128 of the right hand tube is connected in the same manner through a resistance 138 to a second negative potential line 140 to be referred to hereafter as the reset pulse line. This arrangement also forms a voltage divider network between the plate 118 of the left hand tube 112 and the reset pulse line 140 placing the grid 128 of the right hand tube 110 at a point in the voltage divider.

An isolating diode 142 is connected between the reset pulse line 140 and the negative potential line 136. The diode's anode 144 is on the side of the reset pulse line 140 and its cathode 146 on the negative potential line 136 side. Two input diodes 148 connect the grids 128 and 132 of the trigger tubes to a common point 150. Each diode 148 has an anode and a cathode, the anodes being in each case on the grid side. From the common point 150 the diodes are connected through a resistance 152 to the negative potential line 116. A resistance 154 and a condenser 156 are serially connected between the input terminal 48 for the trigger circuit and the negative potential line 116 to form a differentiating network. The output of this input differentiating network is taken from a mid point 160 between the resistance 154 and capacitance 156. The differentiated output is connected through a diode 162 to the common point 150. The diode 162, having an anode and a cathode, is connected with its anode to the common point 150 so as to pass only negative input pulses.

The trigger circuit has two stable conditions, one being when the left hand tube 112 is conductive, the other being when the tube 110 is conductive. When either tube is conductive, the other is biased below cutoff. A sufficiently large negative impulse having the proper characteristics reaching the common point 150 from the input circuits will cause the trigger circuit to reverse from either stable condition to the other. When the trigger circuit reverses to the left, that is, when the right hand tube 110 becomes nonconductive, an effective impulse is transmitted to the next stage, as will be explained presently.

With the trigger circuit representing the zero state of the counter, the left hand tube is conducting. A negative input pulse applied at the input terminal 48 for the trigger circuit will be differentiated and fed through diode 162 and the diodes 148 to the grids of both tubes. Under these conditions, since the grid of the right hand tube is already biased below cutoff because of the lowered voltage of the left hand tube due to its conduction, the negative pulse will be of little effect. However, the receipt of this first negative impulse causes the grid of the left hand tube which is conducting to be biased below cutoff and that tube is thereupon rendered nonconductive. The plate voltage of the left hand tube consequently rises rapidly toward that of the plate supply voltage. This rising voltage is transferred from the plate of the left hand tube 112 to the control grid 128 of tube 110, through the parallel connected resistor and capacitor 126. The grid 128 of the right hand tube 110 is thus made sufficiently positive to start conduction through that tube. Conduction in tube 110 causes its plate voltage to decrease. This decrease is transferred to the control grid 132 of tube 112 through parallel connected resistor and capacitor 130 and maintains tube 112 nonconductive. Tube 110 remains conductive and tube 112 nonconductive until the next negative impulse is received. It is now obvious that the first negative pulse switches the first trigger channel 30 as a whole from the zero condition to the one condition, the one condition, as set forth above, having been preselected with tube 110 conductive and tube 112 nonconductive.

In a similar manner, the arrival of the second negative pulse renders the right hand tube 110 nonconductive and the resulting rise in its plate voltage is transferred to the control grid of the left hand tube 112 to permit that tube to become conductive and to hold tube 110 in a nonconductive state. Also, the decrease in the plate voltage of the left hand tube 112 caused by its conduction is transferred to the control grid of the right hand tube 110. At this time, the decrease in the plate voltage of tube 112 is also transferred to the corresponding common input point of the next trigger channel 32 through a delay circuit 40.

The delay circuit 40 comprises a vacuum tube 172 having a plate, grid, and cathode. The output of the trigger circuit 30 is connected from the plate of the left hand tube 112 through a condenser 174 to the grid 176 of the delay tube 172. A shunting diode 178 and a grid leak resistance 180 are connected in parallel from the grid of the delay tube 172 to the negative potential line 116. The cathode 182 of the delay tube 172 is connected directly to the negative potential line 116. The diode 178 is placed with its anode on the grid side in order to shunt any positive pulses to the negative potential line to prevent their effect on the circuit. A ringing circuit composed of a parallel connected inductance 184 and condenser 186 are connected between the plate 188 of the delay tube and the plate supply voltage line 124. The output from the delay circuit 40 is taken from the plate 188 of the delay tube 172 and connected through a coupling diode 190 and a condenser 192 to the common input point of the next trigger channel 32. The polarity of the coupling diode 190 is such as to pass only negative pulses.

On receipt by the delay circuit 40 of a negative impulse from the first trigger channel, as described above, the delay tube 172, which is normally conducting, is cut off. This causes the plate voltage to rise toward the plate supply voltage. The rise in place voltage causes the ring circuit to oscillate. In the first half cycle of oscillation, the plate voltage first rises to some positive value and then begins a downward swing. Because of the polarity of coupling diode 190, the positive rise in plate voltage cannot pass to the next trigger channel. However, when the downward swing of the plate voltage begins, a negative impulse is transmitted through the diode 190 to the next trigger channel 32 causing it to operate in the same manner as the channel described above. The amount of time delay caused by the delay circuit 40 is dependent upon the circuit parameters (inductance 184 and capacitance 186) of the ring circuit. Other delay circuits 42, 44, and 46 are connected between each of the subsequent trigger channels in the same manner as the delay circuit 40 just described, and perform the same function.

The output from the plate 118 of the left hand tube 112 of the first trigger circuit channel is also connected to the input of a cathode follower amplifier tube 62. The amplifier tube has its plate 204 connected to a B+ power supply line 208. Its cathode 206 is connected through a resistance 210 to a negative potential line 212. The grid 202 of the tube 62 is the input for the cathode follower amplifier and is connected to receive the output from the first trigger channel. Likewise, cathode follower amplifiers 64, 66, 68, and 70 are connected to the output from each of the four remaining trigger channels. The output from the cathode follower 62 is taken from the cathode 206.

The output of each of the cathode follower amplifiers 62, 64, 66, 68 is connected to a plurality of readout "and" gates 82, 84, 86, and 88, shown in Fig. 2*b* for the first four channels through leads 216, 218, 220, and 222. These leads have been given the same numerical designation in both Fig. 2*a* and Fig. 2*b*. Thus, the leads numbered 216 to 222 inclusive in Fig. 2*b* are continuations of those leads having the corresponding numbers in Fig. 2*a*. As all of these "and" gates 82, 84, 86, and 88 operate in the same manner, only the "and" gate 82 in the first channel will be described.

The output of cathode follower 62, via the lead 216, is connected to a common point 240 of the "and" gate 82 through a diode 242. The diode 242 is positioned with its anode on the side of the common point 240. A resistance 244 connects the common point 240 to a relatively high voltage line 246. A second diode 248, providing the second input for the "and" gate 82, has its anode connected to the common point 240. Its cathode is connected through a resistor 250 to a —80 volt potential line 252. A readout pulse line 254 is connected through a condenser 256 to the cathode of input diode 248. A clamping diode 260, hereinafter referred to as an output diode, is connected between the common point 240 and a —10 volt line 258, the diode's cathode being on the side of the common point.

In its quiescent condition, the "and" gate's two input diodes 248 and 242 are normally conducting, drawing current through resistor 244. The current flow causes a voltage drop to appear across the resistor 244 placing the common point 240 at some negative potential with reference to negative potential line 116. With the common point at a negative value, diode 260 becomes conductive. Under these quiescent operating conditions, if the trigger circuit 30 of the first channel is in an "on" condition with the left hand tube not conducting, a positive voltage is applied to the cathode of input diode 242, causing this diode to cease conduction. The cessation on conduction in input diode 242 has no effect upon the voltage at the common point 240 since the input diode 248 and diode 260 remain in a conductive state, effectively clamping the voltage at common point 240 to a negative value. With this set of conditions existing, if a positive pulse is applied through the readout line 254, diode 248 will also cease conduction, allowing the voltage at common point 240 to rise. When voltage rises in a positive direction beyond —10 volts, the output diode 260 will cease conduction, thereby causing the positive pulse to be passed to the output 262 of the first channel. The remaining "and" gates operate in this same manner. A slight modification of circuitry occurs at the input to the output for the "two" and "four" channels.

In the "two" channel, isolating diode 270 and clamping diode 272 are serially connected between one of the inputs to "and" gate 84 and a —60 volt potential line 276. The anodes of the diodes are placed on the side of the —60 volt line. The output of the cathode follower 64, via the lead 218, is connected to a mid point 278 between the two diodes 270 and 272. One function of these diodes is to permit the passage of positive pulses to the "and" gate 84. The diode 272 has the further function of clamping the cathode of the amplifier 64 to the voltage on negative potential line 276.

The output of amplifier 64 and 66 for the "two" and "four" channels are connected through diodes 300 and 302, respectively, to a common point 304 of "or" gate 72. The polarity of these diodes is such as to pass only positive pulses from the output of the cathode followers. The common point 304 of the "or" gate 72 is in turn connected to the cathode of an input diode 306 of the "and" gate 74. This input diode 306 is also the output diode of "or" gate 72. A second input to the "and" gate 74 is connected from the output of the cathode follower 68 of the "eight" channel, via the lead 222, through the cathode side of a diode 308 to a common point 310 of the "and" gate 74. A third diode 312 is connected with its cathode side to common point 310 of the "and" gate 74 and its anode side to the —10 volt line 258.

This third diode 312, in conjunction with a resistance 314 connected between common point 310 and the high voltage line 246, provides a clamping action similar to diode 260.

In the quiescent condition, all three diodes of the "and" gate 74 are conducting. Upon receipt of voltage from the "eight" channel and from "or" gate 72, the two input diodes 308 and 306 are blocked, causing the common point 310 to rise in voltage. The voltage rise blocks the conduction of diode 312 thereby providing a positive output pulse. It is noted here that the operation of this "and" gate 74 is essentially the same as described in the description of Fig. 1 and will not pass a signal except in the presence of voltages on both inputs.

The output of "and" gate 74 and the output of the cathode follower amplifier 70 for the "sixteen" channel, are both connected to an "or" gate 76. The output from the "and" gate 74 is connected through an input diode 320 of the "or" gate 76 to a common point 322. A resistance 324 is connected between —80 volt potential line 252 and the common point 322 of the "or" gate 76. The second input to the "or" gate 76 is connected by way of a lead line 326 (designated by this same number in both Fig. 2*a* and Fig. 2*b*) through a diode 328 from the amplifier output of the "sixteen" channel to the common point 322. The output of the "or" gate 76, from common point 322 is connected by way of a lead line 329 (designated by this same number in both Fig. 2*a* and Fig. 2*b*) through a decoupling network 330 to the input of the bistable trigger circuit 78 (see Figure 2*a*). The diodes in the "or" gate 76 are connected with such polarity as to pass positive input pulses from either of the two input sources, the function of this "or" gate being the same as that previously described.

The decoupling network 330 consists of an input condenser 332 and a second condenser 334 serially connected between the output of the "or" gate 76 to the input of the bistable multivibrator 78. A diode 336 is connected from the mid-point between the two condensers 332—334 to negative potential line 116 with its anode on the side of the negative potential line.

The bistable trigger circuit 78 is similar to those of the trigger channels 30 to 38 described above. The bistable trigger circuit 78 consists of two vacuum tubes 340 and 342, each having a plate, grid and cathode. The cathode 344 of the right hand tube 342 and the cathode 346 of the left hand tube 340 are connected to negative potential line 116. The grid 350 of the right hand tube 342 and the grid 354 of the left hand tube 340 are connected through a resistance 355 and 356, respectively, to negative potential line 136. A parallel connected resistance and capacitance 357 are connected between the grid 350 of the right hand tube and the plate 358 of the left hand tube. The plate 359 of the right hand tube is connected through a resistance 360 to the plate supply line 124, and through a parallel connected resistor and capacitor 361 to the grid 354 of the left hand tube 340. Likewise the plate 358 of the left hand tube is connected to the plate supply line 124 through a resistance 362, but is also connected to the input of a delay circuit 80. The grid 350 of the right hand tube 342 is also connected through the cathode of a diode 363 to negative potential line 116, and is connected directly to the reset pulse source 140 through a condenser 366. The plate 359 of the right hand tube is connected through an input condenser 364 to the common input point 150 of the "one" channel.

The delay circuit 80 utilizes a single vacuum tube 370 having a plate, a grid, and a cathode. The grid 372 is the input for the delay circuit 80 and is connected through a resistance 374 and a shunting diode 376, placed in parallel with the resistance, to the cathode 378. The cathode 378 is connected to the negative potential line 116. The diode 376 is connected with its anode on the grid side to pass positive pulses to ground thereby preventing them from having any effect upon the delay circuit 80. The plate 380 of the delay tube 370 is connected to a ringing circuit 382 consisting of an inductance and capacitance placed in parallel. The other side of the ringing circuit is connected to the plate supply line 124. Also connected to the plate are input condensers 390 and 392 for the "four" and "two" trigger channels, respectively.

In its quiescent condition, the right hand tube 342 of the trigger circuit 78 is normally conductive. Upon receipt of a positive pulse from "or" gate 76, the left hand tube 340 is keyed on, thereupon sending a pulse through coupling condenser 357 to the grid 350 of the right hand tube 342 which tends to cut the right hand tube off. As the conduction through the left hand tube increases, its plate voltage falls, maintaining the grid 350 of the right hand tube 342 at a voltage below cutoff, tending to keep the right hand tube in an "off" condition and the left hand tube conducting. This operation is the same as that described for the trigger channels of the counter circuit. When the left hand tube first starts conducting, a negative pulse is transmitted to the input grid 372 of the delay circuit 80. This delay circuit 80, functioning in the same manner as those previously described, delays the pulse momentarily, depending upon the ring frequency of the LC circuit 382, and transmits a negative pulse to the input of the "two" and "four" channels. This pulse effectively adds a six to the binary representative number, as previously described with reference to the block diagram of Fig. 1. Once the input pulse is applied to trigger circuit 78, changes in the condition of the trigger channels due to the addition of six have no effect upon its operation since the decoupling network 330 will pass any intermediate negative impulses to ground and any subsequent positive pulses are applied to an already positive grid 354.

After a sufficient time for a readout pulse to obtain the converted binary number from the "and" gate outputs, has elapsed, a negative reset pulse is applied to the reset pulse line 140. This pulse restores the trigger channels to their normal operating condition. The reset pulse has a relatively long time duration to overcome the transient effects caused by the delay circuits, as was previously described. It is also applied to the grid 350 of trigger circuit 78 through condenser 366.

The reset pulse is differentiated by condensed 366 and diode 363 and the pulses resulting from the leading and trailing edges are applied to the grid 350. Because of the polarity of diode 363 the leading edge of the reset pulse produces little or no output. This occurs since the negative pulse, which would be produced by differentiating the leading edge of the reset pulse, is shunted to ground by diode 363.

The trailing edge of the reset pulse, when differentiated, produces a positive pulse which meets the high value back resistance of diode 363. This larger resistance value allows a relatively large positive voltage to build up across it which is applied to the grid 350 of the right hand trigger tube 342. This pulse reverses the conducting state of the trigger circuit 78 back to its original condition. When this reversal occurs, a negative pulse is generated at the plate of trigger tube 342. This is applied through input condenser 364 to the "one" channel, thereby adding "one" as a carry pulse for the next binary decade operation.

It should be noted that while this system has been described without reference to any timing arrangement, a standard clock pulse may be used to inaugurate the various operations, such as placing the numbers to be added, reading out, or resetting the trigger channels. Further, instead of the bistable multivibrator 78, a univibrator, having a pulse of known length that is longer than the time required to perform the conversion and readout, may be used.

Due to the fact that both of the "two" and "four" channels have several inputs, the input circuits to the "two" and "four" channels are slightly modified over the input circuit of the "one" channel. The "two" channel will be described in detail. One input is connected from the trigger circuit 78 to a point 400. The second input is connected from the binary input 52 for the "two" channel through a condenser 402 to a point 404. Each of these points 400 and 404, respectively, are at a position mid way between a serially connected resistor 406 and diode 408, and resistor 410 and diode 412, respectively. Each of these serially positioned elements are connected in parallel. The resistive end 414 of this parallel circuit is connected to a positive supply line 416. This connection to the positive supply line 416 provides a resistance discharge path for condensers 392 and 402. Similarly, the diode end 418 of this parallel circuit is connected through a resistance 420 to the same positive line 416, and to the input condenser 192 of the "two" trigger channel. The cathodes of the diodes 408 and 412, respectively, are positioned adjacent the common points 400 and 404, respectively, to pass only negative input pulses to the input of the "two" trigger channel.

Because of the use of diodes in this invention, relatively little power is required to operate the conversion gating apparatus. Further, the use of "and" gates and "or" gates does not require critically adjusted voltages for correct operation. The maintenance problem is also minimized since even though the operating efficiency of the diode being used may fall off, the circuit will still perform correctly. The replacement of parts poses no particular problem since the elements used are relatively simple, and are easily located when not functioning properly.

There has been shown and described hereinabove a novel system requiring a minimum amount of apparatus for obtaining a relatively inexpensive and efficient binary to binary decimal converter, the construction, operation and maintenance of which is relatively simple, and which will operate at a high rate of speed. Furthermore, the converter operates only after a binary number is ten or greater, thereby providing an accurate indication when a binary number is less than ten as well as when the number is more than ten.

What is claimed is:

1. A code converter including a plurality of serially connected binary channels, each channel comprising a trigger circuit having a zero and a one condition whereby a number is represented in a binary coded form, each of said trigger circuits being adapted to change alternately from one of said conditions to the other on receipt of successive operating impulses, means to transmit an operating impulse to the next channel of said series upon a lower order channel attaining a predetermined condition, gate circuits responsive to preselected conditions of said channels, a pulse generator actuated by said gate circuits and adapted to apply operating impulses to certain of said channels when actuated to change the conditions of said trigger circuits therein from a number representation in one binary coded form to a second binary coded form, and means for determining the conditions of certain ones of said trigger circuits for reading out said number representation in a second binary coded representation of said number.

2. A binary to binary coded decimal converter including a series of parallel binary number representing channels, each of said channels comprising a trigger circuit having a zero and a one condition whereby a number is represented in a binary coded form, each of said trigger circuits being adapted to change alternately from one of said conditions to the other on receipt of successive operating impulses, means to transmit an operating impulse to the next channel of said series upon a lower order channel attaining a predetermined one of said two conditions, a gate circuit means responsive to preselected conditions of said channels, means including a pulse generator actuated by said gate circuit means and adapted to apply operating impulses simultaneously to certain of said channels to change the conditions of said trigger circuits therein to convert the binary representation of a number established in said channels to a binary coded decimal representation, means for determining the conditions of certain ones of said trigger circuits for reading out said binary coded decimal representation, resetting means adapted to reset said channels to said zero condition after said readout has occurred, and means including said pulse generator to generate a carry pulse to the lowest order one of said channels responsive to said resetting means.

3. In a converter, a plurality of bistable channels adapted to establish voltages representative of a number in binary form, means to establish said voltages on said channels, coincidence gate circuit means connected to the output of certain of said channels to pass an impulse only on the coincidence of voltages therefrom, pulse generating circuit means connected to the output of said coincidence gate circuit means to generate a pulse responsive to an impulse therefrom, and means coupling said pulse generating circuit means to certain of said channels to convert said voltages representative of said number in binary form to voltages representative of said number in a binary coded decimal form.

4. In a converter, a plurality of bistable trigger channels adapted to establish voltages representative of a number in a binary form, means to establish said voltages on said channels, coincidence gate circuit means connected to the output of certain of said channels to pass an impulse only on the coincidence of voltages therefrom, pulse generating circuit means connected to the output of said coincidence gate circuit means to generate a single pulse responsive to an impulse from said coincidence gate circuit means, means to apply said generated pulse to certain of said channels whereby said binary number is represented as a binary coded decimal number, and read out means to sense voltages established in certain ones of said channels to readout said binary coded decimal representation of said number, said pulse generating circuit means including means to generate a carry pulse and couple said carry pulse to the lowest binary order one of said channels.

5. In a converter, a first, second, third, fourth and fifth bistable trigger channels, respectively, corresponding to successive increasing binary orders, respectively adapted to establish voltages representative of a number from zero to nineteen in binary form, means to establish said voltages on said trigger channels, a sensing gate circuit means connected to the outputs of said second and third channels to pass an impulse if voltages are present on the output of either, coincidence gate circuit means connected to the output of said sensing gate circuit means and to said fourth channel to pass an impulse only on the coincidence of voltages therefrom, pulse generating means connected to the output of said coincidence gate circuit means to generate a single pulse responsive to an impulse from said coincidence gate circuit means, means coupling said pulse generating means to said second and third channels to alter said voltages representative of said number in binary form to voltages representative of said number in binary coded decimal form, and readout means connected to certain ones of said channels to readout said voltages representative of said number in binary coded decimal form, said pulse generating means including means to generate a carry pulse and couple said carry pulse to said first channel after said readout has occurred to represent a carry for the next decade operation.

6. In a converter, a series of channels adapted to establish voltages representative of a number in binary form, each of said channels having a zero and a one condition and including means whereby each channel when changing from a one to a zero condition transmits an output pulse to the next higher order channel, coincidence gate circuit means connected to the output of certain of said channels to pass an impulse only upon the coincidence of conditions of said channels, pulse generating circuit means connected to the output of said coincidence gate circuit means to generate a pulse responsive to an impulse from said coincidence gate circuit means, means coupling said pulse generating circuit means to certain of said channels to convert said voltages representative of said number in binary form to voltages representative of said number in binary coded decimal form, and means to read out said voltages representative of said number in binary coded decimal form, said pulse generating circuit means including means to generate a carry pulse to the low binary order one of said channels for the next decade operation.

7. In a converter, a series of parallel channels adapted to receive voltages representing a number from zero to nineteen in binary form, each of said channels having a zero and a one conidtion and including means whereby each channel when changing from a one to a zero condition transmits an output pulse to the next higher order channel, the first of said channels corresponding to the lowest binary order, a sensing gate circuit means connected to two of said channels to pass an impulse if either of said channels is in said one condition, a coincidence gate circuit means connected to the output of said sensing gate circuit means and to the fourth of said channels to pass an impulse only on the coincidence of impulses therefrom, pulse generating means connected to the output of said coincidence gate circuit means to generate a single pulse on receipt of an impulse from said coincidence gate circuit means, means to apply said generated pulse to the second and third of said channels whereby said binary number is represented as a binary coded decimal number, and means to determine the conditions of certain ones of said channels to read out said binary coded decimal represented number, said pulse generating means including means to generate a carry pulse to the first of said channels after said readout has occurred.

8. In a converter, a series of five parallel channels adapted to receive operating impulses to set up voltages representative of a number from zero to nineteen in binary form, in said channels, a plurality of delay networks coupling each of said channels to the next higher order of said channels, the first of said channels corresponding to the lowest binary order, each of said channels having a zero and a one condition and including means whereby each channel when changing from said one condition to said zero condition in response to an operating impulse transmits an operating impulse to the next higher order of said channels, a sensing gate circuit means connected to the second and third of said channels to pass an impulse if either of said channels is in said one condition, a coincidence gate circuit means connected to the output of said sensing gate circuit means and to the fourth of said channels to pass an impulse only on the coincidence of conditions thereof, pulse generating means connected to the output of said coincidence gate circuit means and to said highest order channel to generate a single pulse on receipt of an impulse from said coincidence gate circuit means or said highest order channel, means coupling said pulse generating means to the second and third of said channels to convert said voltages representation of said binary number to voltages representative of said number in binary coded decimal form, and means to read out said voltages representative of said binary coded decimal number, said pulse generating means including means to generate a carry pulse to the first of said channels after said readout has occurred.

9. A converter comprising a series of binary trigger channels connected in cascade and adapted to receive voltages corresponding to a number from zero to nineteen in binary form, means to place voltages representative of said number in binary form on said trigger channels, sensing means connected to the output of said trigger channels adapted to pass a voltage only when said binary represented number is above nine, means including a pulse generator connected to said sensing means to generate a pulse on receipt of said voltage from said sensing means, and means connecting said pulsing means to those ones of said channels representing the number six to convert said voltages representative of said binary number to voltages representative of said number in binary coded decimal form.

10. A converter comprising a series of binary trigger channels connected in cascade and adapted to receive voltages corresponding to a number from zero to nineteen in binary form, sensing means connected to the output of said trigger channels adapted to pass a voltage when said voltages representing said number in binary form are above nine, pulsing means connected to said sensing means to generate a pulse on receipt of said voltage from said sensing means, means to connect said pulsing means to certain of said channels to convert said voltages representative of said binary number to voltages representative of said number in binary coded decimal form, and means to read out said voltages representative of said number in binary coded decimal form, said pulsing means including means to generate a carry pulse after said readout occurs if said sensing means passed said voltage to said pulsing means.

11. A code converter comprising a plurality of bistable state trigger circuits, each capable of being triggered by a pulse from one state to the other, each circuit being representative of a binary digit one when in a first stable state and a binary digit zero when in a second stable state, delay means coupling each trigger circuit to an adjacent trigger circuit to apply a triggering pulse from a lower order to a higher order trigger circuit upon said lower order trigger circuit being driven to one of said two stable states, means to apply voltages to said trigger circuits to establish them in states representative of a binary number, means coupled to certain of said trigger circuits to sense the states thereof to determine when the number represented by them is over nine, a pulse generator responsive to actuation of said sensing means to generate a pulse, means to apply said pulse to trigger certain ones of said trigger circuits to establish states representative of said number in a different binary form, means responsive to the states of said trigger circuits to read out the number represented by the states of said trigger circuits, and means to reset said trigger circuit states to be representative of the binary number one when the previous binary number represented was in excess of nine and to be representative of the binary number zero when the previous binary number represented was not in excess of nine.

References Cited in the file of this patent

UNITED STATES PATENTS

| | | |
|---|---|---|
| 2,411,540 | Haigh | Nov. 26, 1946 |
| 2,537,427 | Seid | Jan. 9, 1951 |
| 2,591,931 | Grosdoff | Apr. 8, 1952 |
| 2,643,820 | Williams | June 30, 1953 |
| 2,697,549 | Hobbs | Dec. 21, 1954 |
| 2,703,202 | Cartwright | Mar. 1, 1955 |
| 2,705,108 | Stone | Mar. 29, 1955 |
| 2,758,788 | Yaeger | Aug. 14, 1956 |
| 2,762,563 | Samson | Sept. 11, 1956 |
| 2,785,854 | Chaimowicz | Mar. 19, 1957 |

FOREIGN PATENTS

| | | |
|---|---|---|
| 975,941 | France | Oct. 17, 1951 |

OTHER REFERENCES

"High Speed Computing Devices," by Engrg. Research Assoc., published by McGraw-Hill Book Co. (pps. 289–292).

Progress Report 2 on the EDVAC, Moore School of Electrical Engineering, Univ. of Pa. Declassified Feb. 13, 1947. Fig. PY–O–181. Pages 1–1–29 and 1–1–30.

"Theory and Techniques for Design of Electronic Digital Computer," lecture 46, entitled, "A Four-Channel Coded Decimal Electrostatic Machine," by C. B. Sheppard, Univ. of Pa.; June 30, 1948.

"Synthesis of Electronic Computing and Control Circuits," Harvard Univ. Copyright May 17, 1951; (pages 159 to 166, and 184 to 186).